United States Patent Office 2,955,023
Patented Oct. 4, 1960

---

2,955,023

PROCESS FOR THE PRODUCTION OF CYANOGEN AND CARBON DISULFIDE

Hans Huemer, Konigstein (Taunus), Germany, assignor to Deutsche Gold- und Silber-Scheideanstalt vormals Roessler, Frankfurt am Main, Germany No Drawing. Filed Feb. 6, 1959, Ser. No. 791,523

Claims priority, application Germany Feb. 7, 1958

4 Claims. (Cl. 23—151)

This invention relates to a process for the production of cyanogen ($C_2N_2$) and carbon disulfide.

The object of this invention is to produce cyanogen and carbon disulfide from certain triazine derivatives.

According to this invention it was found that cyanogen and carbon disulfide can be produced by heating symmetrical thiocyanate triazine derivatives which have an empirical molecular formula of $C_6N_6S_3$. These triazine derivatives probably have a structure such as:

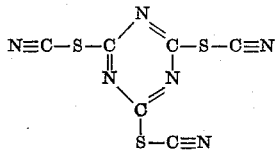

or

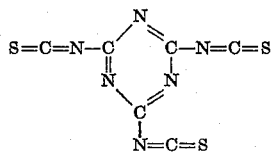

It is possible that both these compounds or their polymers exist together in a mixture. The triazine derivatives can be obtained if a symmetrical triazintrihalide, for example, cyanuric chloride, is reacted with ammonium thiocyanate, an alkali metal thiocyanate or an alkaline earth metal thiocyanate in the presence of a solvent. In this case mixtures of the triazine compound and the halide of the alkali metal or the alkali earth metal are formed. Such mixtures can be used, without difficulty, as the starting material in the production of cyanogen and carbon disulfide according to the invention.

The triazine derivatives are preferably heated up to a temperature up to 750–850° C. By the time this temperature is reached the starting material is practically completely decomposed according to the following reaction:

$$4C_6N_6S_3 = 9C_2N_2 + 6CS_2 + 3N_2$$

At first, carbon disulfide is generated by the decomposition of the triazine derivatives and can be collected separately. As the process temperature rises over 400° C. the formation of cyanogen gas then takes place. Thus, the cyanogen can also be separately collected.

In order to avoid side reactions, care should be taken that the process is conducted in as complete an absence of elemental oxygen and water as is possible.

*Example 1*

The decomposition of the starting material was carried out in a horizontal porcelain tube 730 mm. in length and having an inner diameter of 44 mm. The tube was heated in an electric furnace. The temperatures were measured between the porcelain tube and the furnace. A three-way stopcock was fitted on the tube which interchangeably connected the tube with two separate condensation systems. One condenser acted as a cooling trap for the carbon disulfide and its temperature was maintained at about −30° C. The other condenser, used in turn for cyanogen recovery, was cooled to −70° C.

A mixture of 58 g. of the triazine compound, $C_6N_6S_3$, and 52 g. of potassium chloride were introduced into the porcelain tube. The tube was then rinsed with nitrogen and heated up to 185° C. within a half hour. The generation of the carbon disulfide already began during such heating. Within another hour the tube was heated to 500° C. By the time this latter temperature was reached a total of 21.8 g. of carbon disulfide had been produced. The tube was again rinsed with nitrogen and the three-way stopcock was positioned to connect the tube to the cyanogen condenser and heated up to 835° C. in three hours. 22.3 g. of cyanogen were collected in the condenser. At the conclusion of the heating operation the tube was again rinsed with nitrogen.

According to the above equation, the yield of carbon disulfide amounted to 83.3% of the theoretically possible yield and the yield of cyanogen amounted to 82.7% of the theoretically possible yield. The cyanogen was white and crystalline and the carbon disulfide was only slightly contaminated.

*Example 2*

A mixture of 132 g., composed of 60 g. triazine compound ($C_6N_6S_3$)
54 g. potassium chloride
18 g. potassium thiocyanate was heated in an apparatus as described in Example 1. This resulted in the production of 26.4 g. of carbon disulfide, which was 96.5% of the theoretically possible yield and 25.5 g. of cyanogen, which was 91% of the theoretically possible yield.

Instead of the potassium compounds the corresponding calcium compounds in equimolecular amounts can be used with the same effect.

I claim:

1. A process for the production of cyanogen and carbon disulfide comprising heating a symmetrical thiocyanate triazine derivative having the empirical molecular formula of $C_6N_6S_3$ to a temperature between 750 and 850° C.

2. A process as in claim 1 in which said triazine derivative is heated in the presence of a halide selected from the group consisting of alkali metal and alkaline earth metal chlorides.

3. A process as in claim 2 in which said triazine derivative is heated in the presence of a thiocyanate selected from the group consisting of alkali metal thiocyanates and alkaline earth metal thiocyanates.

4. A process as in claim 1, further comprising conducting said process in the absence of elemental oxygen and water.

References Cited in the file of this patent

UNITED STATES PATENTS 2,864,820    Sheers et al. _____ Dec. 16, 1958

OTHER REFERENCES

Williams: Cyanogen Compounds, Edward Arnold and Co., London, 2nd edition, 1948, page 1.